United States Patent
Shepherd et al.

[11] Patent Number: 5,260,348
[45] Date of Patent: Nov. 9, 1993

[54] SILICONE COMPOSITIONS WHICH EXHIBIT ENHANCED CURE CHARACTERISTICS

[75] Inventors: Brian D. Shepherd, Ballston Lake; David C. Gross, Schenectady, both of N.Y.

[73] Assignee: General Electric Company, Waterford, N.Y.

[21] Appl. No.: 830,017

[22] Filed: Jan. 31, 1992

[51] Int. Cl.$^5$ .................. C08F 2/50; C08G 77/18; C08G 77/04; C08L 83/04
[52] U.S. Cl. ......................... 522/25; 522/29; 522/31; 522/71; 522/72; 522/77; 522/81; 522/83; 522/172; 525/477; 528/18; 528/23; 528/34; 528/901; 523/300
[58] Field of Search ............ 522/77, 71, 72, 81, 522/83, 167, 31, 172, 25, 29; 525/477; 528/18, 34, 23, 901; 523/300

[56] References Cited

U.S. PATENT DOCUMENTS

| | | | |
|---|---|---|---|
| 4,257,932 | 3/1981 | Beers | 260/18 S |
| 4,308,372 | 12/1981 | Smith et al. | 528/34 |
| 4,410,677 | 3/1983 | Lampe | 528/17 |
| 4,417,042 | 11/1983 | Dziark | 528/18 |
| 4,472,551 | 9/1984 | White et al. | 524/728 |
| 4,489,199 | 12/1984 | Wengrovius | 528/16 |
| 4,528,081 | 7/1985 | Lien et al. | 204/159.13 |
| 4,536,540 | 8/1985 | Dziark | 524/701 |
| 4,833,037 | 5/1989 | Beers | 428/448 |
| 4,863,992 | 9/1989 | Wengrovius et al. | 524/731 |
| 4,966,922 | 10/1990 | Gross et al. | 522/25 |

OTHER PUBLICATIONS

Lohse and Zweifel–Photocrosslinking of Epoxy Resins; Advances in Polymer Science 78; Springer-Verlag Berlin Heidelberg 1986.
Eckberg and Riding: Chapter 27, UV Cure of Epoxysiloxanes and Epoxysilicones; 1990 American Chemical Society.
Crivello and Lee; Chapter 28, UV Cure of Epoxy-Silicone Monomers; 1990 American Chemical Society.
R. E. Meyer; Sealants-Encycl. Polymer Sci, Engr.; 1989, 15, 131-145.
K. J. Saunders; "Organic Polymer Chemistry": 2nd Ed., Chapman & Hall: London, 1988.
B. Hardman, A. Torkelson; Encyclopedia of Polymer Science and Engineering, vol. 15, 2nd Edition, pp. 204-308; copyright 1989 by John Wiley & Sons, Inc.
S. Peter Papas-Photoinitiated Cationic Polymerization from "Photopolymerization and Photoimaging Science & Technology" N. S. Allen, ed., Elsevier, London, 1989, Chapter 2.
Crivello et al.-Makromol. Chem. Maromol. Symp. 13/14,145-160 (1988) "Developments in the design and applications of novel thermal and photochemical initiators for cationic polymerization".
Crivello et al.-Cationic Polymerization-Iodonium and Sulfonium Salt Photoinitiators Advances in Polymer Science 62—Springer-Verlag Berlin Heidelberg 1984.

*Primary Examiner*—Susan Berman

[57] ABSTRACT

An improved silicone composition is disclosed, which comprises:

a) at least one silanol chain-stopped polydiorganosiloxane polymer;
b) an acyloxy, alkoxy, or aryloxy-functional crosslinking agent; and
c) a catalytic amount of an onium salt photocatalyst.

These materials are characterized by enhanced cure properties, such as short tack free time; and they can also include various other components, such as fillers, plasticizers, condensation cure catalysts, and adhesion promoters.

32 Claims, No Drawings

SILICONE COMPOSITIONS WHICH EXHIBIT ENHANCED CURE CHARACTERISTICS

This invention relates to silicone compositions. More particularly, it relates to silicone sealant formulations which are alkoxy-, acyloxy-, or aryloxy-based, and which exhibit photochemically-accelerated moisture cure characteristics.

Silicone polymers are well-known in the art, and are very attractive materials for many uses because of their unusual array of properties. Examples of these properties include their thermal and oxidative stability, chemical inertness, resistance to weathering (UV), water repellency, and exceptional elastomeric capabilities. Illustrative uses for these materials include: release coatings and paints, sealants, potting compounds for electronic components, and gaskets.

There are clearly many different types of silicone compositions having various attributes. One very popular type is based on "moisture-cured" silicone polymers. These materials are applied and then simply allowed to cure by diffusion of atmospheric moisture into the polymer.

It may take up to several hours before many moisture-cured silicone polymers are "tack free", i.e., sufficiently cured on the surface to permit further contact. Several days may then be required for full cure through the depth of the silicone material. Obviously, these extended cure times may sometimes be undesirable, especially in a commercial setting; e.g., a factory with stringent overall production schedules and requirements.

Several techniques are available for speeding up cure time. For example, water may be incorporated into the silicone polymer immediately before application. However, this technique requires a mixing step beforehand. Furthermore, while tack free time is reduced, it still may be undesirably long for some applications.

Another technique for accelerating cure involves incorporating acrylic groups into the polymer, in conjunction with the use of a photocatalyst, as described in U.S. Pat. No. 4,528,081 to Lien et al. Brief exposure to UV light renders the composition tack free, with further cure being achieved through the normal moisture-induced mechanism. One disadvantage to this "dual cure" technique is that the acrylic groups are subject to oxygen inhibition when exposed to the UV light.

An improvement in these dual cure systems was achieved by the invention described in U.S. Pat. No. 4,966,922 of D. Gross et al, which describes a silicone composition which is sensitive both to UV light and hydrolytic conditions. The silicone polymer includes an epoxy functional substituted or unsubstituted hydrocarbon group, and the overall composition also includes catalytic amounts of an onium salt photocatalyst and a condensation cure catalyst. Those formulations are very useful in many commercial settings because of the relatively short tack free times achieved with UV exposure. However, they sometimes do not exhibit the degree of shelf stability necessary for certain applications.

A continuing need exists for silicone compositions with reduced tack free time, and with acceptable work life or "tooling time". Moreover, it is sometimes desirable that the compositions be free of the epoxy functional groups utilized in U.S. Pat. No. 4,966,922, since this functionalization represents an additional preparation step. Furthermore, many industrial activities require silicone compositions which exhibit good "controlled cure" characteristics. For example, the materials should be low enough in viscosity upon application to be very "workable", but should then cure quickly to a tack free state upon selected UV exposure. Moreover, it's frequently necessary that these desirable cure characteristics be achieved without substantially sacrificing any of the other important silicone polymer properties, such as thermal stability, tensile strength, or elongation.

SUMMARY OF THE INVENTION

The requirements addressed above have been satisfied by the discovery of an improved silicone composition which comprises (a) at least one silanol chain-stopped polydiorganosiloxane polymer having a viscosity in the range of from about 10 to about 1,000,000 centipoise at 25° C.;

(b) an acyloxy-, alkoxy-, or aryloxy-functional cross-linking agent as described below; and (c) a catalytic amount of an onium salt photocatalyst.

Some embodiments of this invention also include various other components, such as plasticizers, fillers, adhesion promoters, and condensation cure catalysts. As described in the remainder of the specification, the claimed compositions cure very quickly, but are also very amenable to a controlled cure schedule. Furthermore, the enhanced cure characteristics do not deleteriously affect the other desirable physical properties of the composition.

Another aspect of this invention is a method of preparing improved silicone compositions, as described below.

DETAILED DESCRIPTION OF THE INVENTION

As briefly mentioned above, component (a) of the present invention is at least one silanol chain-stopped polydiorganosiloxane polymer. These materials are generally well-known in the art, and often have a viscosity in the range of about 10–1,000,000 centipoise at 25° C. The "organs" group is usually a monovalent hydrocarbon radical, such as an alkyl radical having about 1–8 carbon atoms, e.g., methyl, ethyl, propyl, and the like. Other examples are cycloalkyl radicals such as cyclohexyl, cycloheptyl, and the like; mononuclear aryl radicals such as phenyl, methylphenyl, ethylphenyl, etc; alkenyl radicals such as vinyl, allyl, etc; and fluoroalkyl radicals of about 3–8 carbon atoms, such as 3,3,3,-trifluoropropyl, etc. Suitable polydiorganosiloxane polymers are described, for example, in U.S. Pat. Nos. 4,257,932; 4,308,372; 4,833,037; 4,863,992; and 4,966,922, which are all incorporated herein by reference.

In preferred embodiments, component (a) has the formula

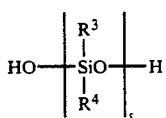

1 wherein $R^3$ and $R^4$ are independently selected monovalent organic groups; and the value of s is such that the viscosity of the polymer is in the range described above. In more preferred embodiments, the viscosity of the polymer is in the range of about 2,000 cps to about 200,000 cps, while some especially preferred embodiments utilize polymers having a viscosity in the range of about 10,000 cps to about 50,000 cps (all measured at 25° C.).

The radicals $R^3$ and $R^4$ can be any of the radicals previously set forth for the "organs" group. In some preferred embodiments, substantially all of the $R^3$ and $R^4$ groups are alkyl (preferably methyl or fluoroalkyl), and any remaining groups are aryl (preferably phenyl).

In preferred embodiments, component (a) constitutes about 40% by weight to about 90% by weight of the total weight of the final composition, while in more preferred embodiments, this component constitutes about 60% by weight to about 85% by weight of the composition. Mixtures of two or more silanol chain-stopped polymers are also possible.

Component (b) of the present invention is a functional crosslinking agent having the formula $$R_mSi(OR^1)_{4-m} \quad \text{II}$$

wherein R is a monovalent hydrocarbon radical containing 1 to about 8 carbon atoms; $R^1$ is an organic radical containing from 2 to about 30 carbon atoms; and m is 0 or 1.

In preferred embodiments, R is a lower alkyl group such as methyl, ethyl, or butyl, with methyl being most preferred. The ($OR^1$) group is usually selected from the broad classes of alkoxy (e.g., methoxy, ethoxy, etc); aryloxy (e.g., phenoxy), or acyloxy (e.g., acetoxy, benzoxy, 2-ethylhexanoxy, etc).

Crosslinking agents suitable for the present invention are generally described in the above-mentioned U.S. Pat. Nos. 4,833,037 and 4,257,932, as well as in U.S. Pat. No. 4,472,551, which is also incorporated herein by reference. In some preferred embodiments of the present invention, the crosslinking agent of component (b) is selected from the group consisting of methyl-triacetoxysilane; ethyl-triacetoxy silane; methyl-tris benzoxysilane; methyl-tris 2-ethylhexanoxy silane, methyltrimethoxy silane and mixtures of any of the foregoing.

A preferred level for component (b) is about 1% to about 12% by weight, based on the weight of the entire composition. In more preferred embodiments, the level is about 2% by weight to about 6% by weight. Those of ordinary skill in the art will be able to select an appropriate level of crosslinker, based on standard considerations such as the hydroxyl content of component (a), and the degree of elasticity required for the overall composition.

Component (c) of the present invention is an onium salt photocatalyst, as mentioned above. The choice of a particular catalyst for the present invention is not critical. They are usually members of the following families: halonium salts; Group VIA salts (e.g., sulfonium salts); and Group VA salts (e.g., phosphonium salts); each of which is known in the art. They are also described in the above-referenced U.S. Pat. No. 4,966,922. Techniques for making and using these salts are also well-known.

Halonium salts are usually represented by the formula $$[(R^6)_e(R^7)_fX]_g{}^+[MQ_h]^{-(h-i)} \quad \text{III}$$

wherein $R^6$ is a monovalent aromatic organic radical; $R^7$ is a divalent aromatic organic radical; X is a halogen such as iodine, bromine, fluorine or chlorine; M is a metal or a metalloid; Q is a halogen radical such as those described above; e is a whole number equal to 0 or 2; f is a whole number equal to 0 or 1; e+f=2 or the valence of X; g=h-i; i is the valence of M, and is an integer in the range of 2 to 7 inclusive; and h is greater than i, and has a value up to and including 8.

The iodonium salts are exemplified by 3-methoxyphenyl-phenyl-phenyl-I+ $BF_4{}^-$; 2-nitrophenyl-phenyl-I+ $BF_4{}^-$; ((4-octyloxyphenyl)phenyliodonium hexafluoroantimonate); and $(C_{12}H_{25\text{-}phenyl})_2I^+SbF_6{}^-$, and the like. Halonium salts are generally described in U.S. Pat. Nos. 4,026,705 and 3,981,897, both of which are herein incorporated by reference.

The Group VIA salts are usually represented by the formula $$[(R^8)_j(R^9)_k(R^{10})_lX']_m{}^+]M'Q'_n]^{-(m-p)} \quad \text{IV}$$

wherein $R^8$ is a monovalent aromatic organic radical; $R^9$ is a monovalent organic aliphatic radical selected from alkyl, cycloalkyl, and substituted alkyl; $R^{10}$ is a polyvalent organic radical which forms a heterocyclic or fused ring structure selected from aliphatic radicals and aromatic radicals; X' is a group VIa element selected from sulfur, selenium, and tellurium; M' is a metal or metalloid; Q' is a halogen radical; j is a whole number in the range of 0 to 3; k is a whole number of 0, 1 or 2; l is a whole number of 0 or 1; j+k+l=3 or the valence of X; m=n-p; p is the valence of M' and is an integer of from 2 to 7; and n is greater than p, and is an integer having a value up to 8. In preferred embodiments, X' is sulfur.

Exemplary sulfonium salts are: triphenyl-S+$SbF_6{}^-$; 4-thiophenoxyphenyl-diphenyl-S+$SbF_6{}^-$; tricyclodiphenylene-phenyl-S+ $BF_4{}^-$; and benzoylmethyl-cyclo-butylene S+ $PF_6{}^-$. Suitable sulfonium salts are also disclosed in U.S. Pat. No. 4,161,478, incorporated herein by reference.

Group VA salts which are suitable for this invention are generally represented by the formula $$[(R^{11})_q(R^{12})_r(R^{13})_sX'']_t{}^+[M''Q''_u]^{-(u-v)} \quad \text{V}$$

where $R^{11}$ is a monovalent aromatic organic radical selected from carbocyclic radicals and heterocyclic radicals; $R^{12}$ is a monovalent organic aliphatic radical selected from alkyl, alkoxy, cycloalkyl, and substituted derivatives of any of the foregoing; $R^{13}$ is a polyvalent organic radical which forms an aromatic heterocyclic or fused ring structure with X''; X'' is a group Va element selected from N, P, As, Sb, and Bi; M'' is a metal or metalloid; Q'' is a halogen radical; q is a whole number in the range of 0 to 4; r is a whole number equal to 0 to 2 inclusive; s is a whole number equal to 0 to 2 inclusive; q+r+s is a value equal to 4 or the valence of X''; t=u-v; v is the valence of M'', and is an integer in the range of 2 to 7; and u is greater than v, and is an integer having a value up to 8. In preferred embodiments, X'' is preferably phosphorus.

Illustrative Group VA salts are: tetraphenyl-P+ $BF_4{}^-$; triphenyl-benzoylmethyl-P+ $AsF_6{}^-$; and dimethyl-phenyl-benzoylmethyl-N+ $BF_4{}^-$. Salts of this type are also described in U.S. Pat. Nos. 4,069,055 and 4,069,056, both of which are incorporated herein by reference.

Halonium salts or sulfonium salts are sometimes preferred for use in the present invention. Halonium salts are often most preferred for some embodiments - especially the iodonium variety. A preferred group of iodonium salts is as follows: 3-methoxyphenyl-phenyl-phenyl-I+ BF$_4^-$; 2-nitrophenyl-phenyl-I+ BF$_4^-$; (C$_{12}$H$_{25}$-phenyl)$_2$ I+SbF$_6^-$; and ((4-octyloxyphenyl)phenyliodonium hexafluoroantimonate).

The level for the photocatalysts of component (c) can be determined without undue experimentation by those of ordinary skill in the art. Usually, the level is in the range of about 0.01% by weight to about 5.0% by weight, based on the weight of the entire composition. In more preferred embodiments, the level is in the range of about 0.1% by weight to about 1.5% by weight, while in most preferred embodiments, the level is in the range of about 0.3% by weight to about 0.9% by weight.

While the onium salt photocatalyst can be added to the composition by any suitable technique, it is sometimes preferably added in the form of a solution. For example, the halonium salts are often added in the form of a solution which includes an agent like ethyltriacetoxysilane or methyltrimethoxysilane. The concentration of photocatalyst in the solution is usually in the range of about 5% by weight to about 50% by weight.

The compositions of the present invention can also include effective amounts of at least one plasticizer. Suitable plasticizers for use in this invention are generally known in the art. One type of plasticizer is a diorganopolysiloxane polymer. These materials often have a viscosity in the range of about 10 to 5,000 cps at 25° C.; and the organo groups are usually monovalent hydrocarbon radicals. In preferred embodiments, these materials are substantially linear.

Particularly preferred polydiorganosiloxane plasticizers for the present invention are those which are trialkylsilyl-terminated, such as the siloxanes of the formula

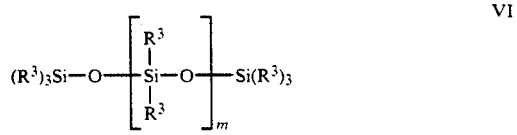

VI wherein each R$^3$ is independently an unsubstituted or substituted hydrocarbon radical containing about 1-13 carbon atoms, and m is in the range of about 5-5000. Exemplary R$^3$ radicals are methyl, ethyl, phenyl, trifluoropropyl, and vinyl. Alkyl radicals having up to about 4 carbon atoms are preferred, with methyl radicals often being most preferred. Plasticizers of this type are generally described in U.S. Pat. Nos. 4,863,992 and 4,410,677, both of which are incorporated herein by reference.

Another type of plasticizer suitable for this invention is commonly referred to as an "MDT" siloxane fluid, which is a silicone made up of monofunctional, difunctional, and trifunctional siloxane units. These materials usually contain about 0.1% by weight to about 1.0% by weight silanol, and are discussed in the above-referenced U.S. Pat. No. 4,966,922. A commercial example of such a material is DF-581, available from General Electric Company.

The appropriate level of plasticizer can be determined by those of ordinary skill in the art without undue experimentation, based on various considerations, such as the particular type of component (a) employed; viscosity requirements; and the elongation characteristics desired for the final product. Usually, the level of plasticizer is in the range of about 1% by weight to about 30% by weight, based on the weight of the entire composition, with a preferred level being in the range of about 3% by weight to about 30% by weight. A most preferred range for some embodiments is about 5% by weight to about 15% by weight.

Compositions of the present invention can also include at least one filler. These materials are well-known in the polymer arts for extending or reinforcing polymer systems. Examples of suitable fillers are fumed silica, precipitated silica, crystalline silica, glass, titanium dioxide, zinc oxide, zirconium silicate, silica aerogel, iron oxide, diatomaceous earth, calcium carbonate, chromic oxide, zirconium oxide, alpha quartz, calcined clay, carbon black, graphite, synthetic fibers, and cotton. Mixtures of extending fillers and reinforcing fillers are also contemplated for the present invention.

Reinforcing fillers such as the silicas mentioned above are sometimes treated with cyclopolysiloxane or with various silazanes. One reason for such a treatment is to prevent an undesirable increase in the viscosity of the composition in the uncured state. Treated fillers and treatment techniques are taught, for example, in U.S. Pat. Nos. 2,938,009 (Lucas); 3,004,859 (Lichtenwalner); 3,635,743 (Smith); and 4,833,037 (Beers), all of which are incorporated herein by reference. Preferred fillers for some embodiments of the present invention are fumed silica and precipitated silica, (especially when treated in the manner described above).

An appropriate level of filler can be determined without difficulty by one of skill in the art. Usually the total amount of filler present is in the range of about 1% by weight to about 70% by weight, based on the weight of the entire composition. In more preferred embodiments, the total amount of filler is in the range of about 2% by weight to about 30% by weight, and in some highly preferred embodiments, is in the range of about 5% by weight to about 25% by weight.

The amount of fumed silica itself is usually in the range of about 2% by weight to about 30% by weight, based on the weight of the entire composition.

Various other aspects regarding fillers are taught in the following U.S. Patents, some of which were mentioned above; and all of which are incorporated herein by reference: U.S. Pat. Nos. 4,966,922; 4,863,992; 4,472,551; 4,417,042; and 4,308,372.

In some embodiments of the present invention, an adhesion promoter is utilized. These materials are known in the art and described, for example, in U.S. Pat. Nos. 4,257,932 and 4,966,922, mentioned above. Examples of adhesion promoters are silanes containing hydrolyzable groups, such as glycidoxypropyltrimethoxysilane; gamma-aminopropyltrimethoxysilane; methyldimethoxyaminosilane; vinyltriacetoxysilane; dibutoxydiacetoxysilane; gamma-aminopropyltrimethoxysilane; gamma-aminopropyltriethoxysilane; and 2-aminoethylaminopropyltrimethoxysilane. A preferred group of promoters from this class consists of glycidoxypropyltrimethoxysilane and di-tert-butoxydiacetoxysilane.

Another class of adhesion promoters suitable for the present invention are various cyanate- and cyanurate-type materials, such as compounds generally conforming to the formula

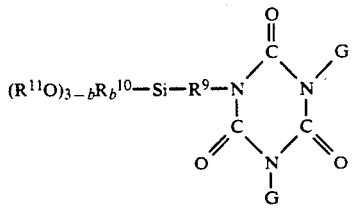

wherein G is a $(R^{11}O)_{3-b}$—$R_b^{10}$—Si—$R^9$ radical, styryl, vinyl, allyl, chloroallyl or cyclohexenyl radical or a $R^{10}$ radical, as hereinafter defined; $R^9$ is a divalent radical selected from alkylenearylene, alkylene, cycloxyene and halosubstituted divalent radicals of any of the foregoing; $R^{10}$ is a radical of up to 8 carbon atoms selected from hydrocarbyl or halohydrocarbyl, and $R^{11}$ is a radical of the type defined for $R^{10}$, and also cyano lower alkyl; and b is 0 to 3.

Materials of this type are also described in U.S. Pat. No. 3,517,001, which is incorporated herein by reference. A preferred group of promoters of this type consists of 1,3,5-tris-trimethoxysilylpropylisocyanate and bis-1,3-trimethoxysilylpropylisocyanurate.

The amount of adhesion promoter present is usually in the range of about 0.2% by weight to about 3% by weight, based on the weight of the entire composition. In more preferred embodiments, the amount of promoter is often in the range of about 0.5% by weight to about 2% by weight.

Condensation cure catalysts are sometimes useful for the present invention. The choice of a particular condensation catalyst is not critical. Many are metal complexes of tin, titanium, aluminum, zinc, zirconium, and the like. Others are Bronsted acids of nonmetal compounds such as acetic acid, ammonium carboxylates, and the like. The above-referenced U.S. Pat. Nos. 4,966,922 and 4,472,551 provide descriptions of many suitable catalysts which fall into these general classes.

Examples of suitable tin catalysts include dibutyltindiacetate; dibutyltindilaurate; dibutyltindimethoxide; carbomethoxyphenyl tin trisuberate; tin octoate; isobutyl tin triceroate; dimethyl tin dibutyrate; dimethyl tin di-neodecanoate; triethyl tin tartrate; dibutyl tin dibenzoate; tin oleate; tin naphthenate; butyltin tri-2-ethylhexoate; tinbutyrate; dibutyl tin bis(acetylacetonate); and dibutyltinphthalate.

The following titanium compounds are also illustrative for compositions of this invention: 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate; and mixtures of any of the foregoing. Other titanium-based materials are also disclosed in U.S. Pat. No. 3,334,067, incorporated herein by reference, such as beta-dicarbonyltitanium compounds.

Suitable aluminum catalysts are described, for example, in U.S. Pat. No. 4,489,199, incorporated herein by reference. Exemplary compounds are aluminum isopropoxide di(ethylacetoacetonate); aluminum di(methoxide)ethylacetoacetonate; aluminum methoxide di(ethylacetoacetonate); and aluminum bis(trimethylsiloxide)ethylacetoacetonate.

An example of a suitable zirconium compound is zirconium octoate.

Other examples of metal condensation catalysts are lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; and zinc stearate.

It is believed that any conventional nonmetal condensation catalyst can also be used in the present invention. Examples of these types of compounds are hexylammonium acetate and benzyltrimethylammonium acetate.

Those familiar with the curing mechanisms for polysiloxane compositions can determine the proper amount of condensation cure catalyst, without exhaustive experimentation. Usually, the condensation cure catalyst level is in the range of about 10 ppm to about 2% by weight, based on the entire weight of the composition. A more preferred level for most embodiments is in the range of about 10 ppm to about 1% by weight.

Compositions of this invention may also include dye sensitizers (photosensitizers), which sometimes increase the effectiveness of the onium salt photocatalyst. Both cationic dyes (such as Acridine orange; C.I. 46005) and basic dyes (such as hematoporphyrin) would be suitable. Many other dyes are described in the above-referenced U.S. Pat. No. 4,966,922; as well as in U.S. Pat. No. 4,026,705, incorporated herein by reference; and in the Kirk-Othmer Encyclopedia, 2nd Edition, 1965, Vol. 20. An appropriate amount of dye sensitizer can easily be determined, based on the type and amount of photocatalyst used.

A variety of other conventional additives may be present in compositions of this invention, in amounts effective for the intended function of the additive. Examples of such materials are dyes, pigments, additional crosslinking agents, thixotropic agents, methanol scavengers and UV stabilizers.

Methods for preparing and using the compositions of this invention are generally well-known in the art. The following reference includes a general discussion on various aspects of the compositions: *Encyclopedia of Polymer Science and Engineering*, Wiley-Interscience , John Wiley & Sons, 1989, Second Edition, Volume 15, pp 204–308. Furthermore, two patents referenced and incorporated above, U.S. Pat. Nos. 4,257,932 and 4,308,372, describe various techniques for preparation of silicone compositions. Typically, the silanol chain-stopped polydiorganosiloxane polymer(s) of component (a) can simply be admixed (under substantially anhydrous conditions, and with high shear mixing) with the crosslinking agent of component (b), and with other optional components, like the filler, plasticizer, and condensation cure catalyst. Furthermore, the onium salt photocatalyst can be mixed in with the other components, but is prefereably added downstream, e.g., after any filler has been mixed with component (a).

Sometimes, it is desirable to exclude the crosslinker, adhesion promoter, and condensation catalyst while compounding component (a) and the other materials at an elevated temperature, to remove moisture and facilitate the wetting of the fillers, if present. In general, if the compositions are to be stored for periods of time, care should be taken to exclude moisture when the components are first combined.

Another aspect of the present invention is a method for preparing improved silicone compositions and articles. The method comprises the steps of:

a) blending (i) at least one silanol chain-stopped polydiorganosiloxane polymer having a viscosity in the range of from about 10 to about 1,000,000 centipoise at 25° C., with (ii) a functional crosslinking agent of the formula $$R_mSi(OR^1)_{4-m}$$

wherein R is a monovalent hydrocarbon group containing 1 to about 8 carbon atoms; $R^1$ is an organic radical containing from 2 to about 30 carbon atoms, and m is 0 or 1;

b) adding a catalytic amount of an onium salt photocatalyst to the blend product of step (a); and then c) exposing the resulting silicone composition to moisture, and irradiating it according to a time- and UV energy schedule effective to cure the composition to a desired degree.

The polydiorganosiloxane, crosslinking agent, and onium salt photocatalyst are as described above. Furthermore, the blending step is not especially critical, and various techniques have been taught here and in many of the references mentioned above. Alternatively, the photocatalyst can be mixed with the polydiorganosiloxane and crosslinker in one step. Furthermore, the irradiation schedule can be determined by those of ordinary skill in the art without undue experimentation, based on the parameters set forth herein, as well as on characteristics of the particular composition being cured, e.g., its thickness. Usually, the amount of UV energy applied is in the range of about 20 mJ/cm$^2$ to about 2000 mJ/cm$^2$, with about 100–1000 mJ/cm$^2$ being more typical.

All of the optional components mentioned above can also be used in this process. Moreover, techniques for molding the compositions into various shapes (prior to complete cure) are known in the art.

The following examples illustrate specific compositions in accordance with the teachings herein. It should be understood that the examples are given only for the purpose of illustration. All parts and percentages are based on weight, unless otherwise specified.

EXAMPLES

Example 1

Two silicone base formulations were utilized in this example, and contained the following:

DIOL POLYMER: The diol polymer for Base I, which was employed for samples 1 and 2, was a mixture of two silanol-terminated polydimethylsiloxane fluids. One had a viscosity of about 30,000 cps (0.03–0.04 wgt. % OH), and the other had a viscosity of about 3,000 cps (0.08–0.09 wgt. % OH), for a blend viscosity of approximately 15,000 cps (+ or −2,000 cps).

The diol polymer for Base II, which was employed for samples 3 and 4, consisted of a single silanol-terminated polydimethylsiloxane fluid, i.e., the Base I polymer which had a viscosity of about 30,000 cps.

SILICA FILLER: The silica filler for Base I was an octamethylcyclotetrasiloxane ("D$_4$") - treated fumed silica.

The filler for Base II was Aerosil 150 VS, an untreated silica filler available from Degussa Corporation.

PLASTICIZER: The plasticizer used in Base I was a trimethylsilyl-stopped polydimethysiloxane fluid having a viscosity of 100 cps. There was no plasticizer in Base II.

CURE PACKAGE: The cure package used in Base I contained the following:

a) 5.2 pbw of methyltriacetoxysilane ("MeSi(OAc)$_3$") as a crosslinker;

b) 1.3 pbw of di-tertbutoxydiacetoxy silane ("t-BuO)$_2$Si(OAc)$_2$") as an adhesion promoter; and c) 20 ppm of dibutyltindilaurate ("Bu$_2$S$_n$(laurate)$_2$") as a cure catalyst.

Base II did not contain any cure package.

The following materials were added to the base formulaions for this example, as shown in Table 1:

PHOTOCATALYST: As shown in Table 1, certain samples according to the present invention contained an onium salt catalyst. The catalyst used was ((4-octyloxyphenyl)phenyliodonium hexafluoroantimonate). The catalyst was supplied in the form of a solution in ethyltriacetoxysilane: 8.3% by wgt for sample 2; 8.9% by wgt for sample 4.

ETHYLTRIACETOXYSILANE ("EtSi(OAc)$_3$")- (Carrier Solution for Photocatalyst): This silane was used in samples 2–4 at the levels shown in Table 1, which also lists all of the formulations for this example:

TABLE 1

| COMPONENT | Sample Parts by Weight | | | |
|---|---|---|---|---|
| | 1* | 2 | 3* | 4 |
| Diol polymer[1] | 100 | 100 | 100 | 100 |
| Silica filler | 20.0 | 20.0 | 6.4 | 6.4 |
| Plasticizing fluid | 15.0 | 15.0 | 0 | 0 |
| Cure package | 6.5 | 6.5 | 0 | 0 |
| EtSi(OAc)$_3$ | 0 | 4.4 | 4.1 | 4.1 |
| Photocatalyst | 0 | 0.4 | 0 | 0.4 |

\* = Control
[1] = Samples 1 & 2 employed Base I; samples 3 & 4 employed Base II The base formulations set forth in Table 1 were mixed by standard techniques and then put into Semco tubes. Samples 1 and 3, which do not contain the photocatalyst, are controls, while samples 2 and 4 conform to the present invention. In each of the latter samples, the solution of photocatalyst in ethyltriacetoxysilane was introduced into the base formulations using dasher rods and Semkit mixers (mixing time was at least 10 minutes).

A portion of each sample was then applied to a teflon sheet mold, and then levelled to a thickness of about 0.125 inches.

As shown in Table 2, the samples were irradiated for various time periods. The irradiation source, a GEH3T7 lamp, was 6 inches from the surface of the material. Irradiating energy values were as follows:

| Irradiation Time (sec) | UV Energy (mJ/cm$^2$) |
|---|---|
| 0 | 0 |
| 15 | 188 |
| 30 | 386 |
| 60 | 727 |
| 120 | 1453 |

Another portion of each sample was simply spread onto a surface for tack free time tests (TFT), which were then measured by standard techniques. The results are shown in Table 2:

TABLE 2

| Sample | Irradiation Time (sec) | TFT (min) |
|---|---|---|
| 1* | — | 12–14 |
| 2 | 0 | 12–14 |
| 2 | 15 | 7–9 |
| 2 | 30 | 3–5 |

TABLE 2-continued

| Sample | Irradiation Time (sec) | TFT (min) |
|---|---|---|
| 2 | 60 | 1–3 |
| 2 | 120 | 0–1 |
| 3* | — | 60–70 |
| 4 | 0 | 60–70 |
| 4 | 30 | 9–11 |

* = Control

The data in Table 2 demonstrate that the formulations of the present invention are characterized by significantly reduced tack free times, as compared to the control samples. The tack free state of sample 2 was measured during an extended irradiation schedule, and the results show a generally constant reduction in tack free time as the irradiation time is increased.

Application rates were also measured for stored portions of samples 1–4, at both 3 days and 64 days after the portions had been catalyzed. The rates (in grams/minute) were measured through a ⅛ inch orifice, under 90 psi delivery pressure. The results are shown in Table 3:

TABLE 3

| | Application Rate (g/min)** | |
|---|---|---|
| Sample | (3 days) | (64 days) |
| 1* | 230 | 205 |
| 2 | 299 | 427 |
| 3* | 184 | 258 |
| 4 | 189 | 260 |

* = Control
** = Grams per minute

Table 3 demonstrates the compositions of this invention can still be readily dispensed after extended storage, indicating that no premature cure had occurred.

Physical properties for these samples were also measured. Those which contained the photocatalyst were irradiated for 30 seconds prior to testing, according to the irradiation scheduled mentioned above. Testing was performed after these portions of the samples had been stored for 12 days and for 61 days at 50% relative humidity. Generally, standard ASTM tests were used, unless otherwise indicated.

The results for the samples of example 1 are shown in Table 4:

TABLE 4

| | | Sample Number | | | |
|---|---|---|---|---|---|
| PROPERTIES | | 1* | 2 | 3* | 4 |
| Stress (psi) | | | | | |
| @ 50% Elongation | 12d** | 53 | 67 | 43 | 46 |
| | 61d** | 48 | 53 | 35 | 39 |
| @ 100% Elongation | 12d | 78 | 94 | 57 | 64 |
| | 61d | 71 | 76 | 49 | 57 |
| @ 200% Elongation | 12d | 121 | 138 | 78 | — |
| | 61d | 115 | 119 | 67 | 90 |
| Modulus (psi) | 12d | 42 | 45 | 21 | — |
| (100–200%) | 61d | 44 | 43 | 19 | 34 |
| Shore A Hardness | 12d | 17 | 23 | 15 | 16 |
| | 61d | 14 | 21 | 16 | 20 |

* = Control
** = 12 days, 61 days

The data in Table 4 demonstrate that in general, various important physical properties for the compositions of this invention are comparable to properties for compositions which do not contain the photocatalyst.

An additional test was performed to determine the effect of heat from the irradiating lamp on the cure characteristics of the samples described above. Samples 1 and 2 were both subjected to irradiation under generally the same conditions described above. The temperature of each sample was measured during selected time intervals, using a Type K thermocouple on the sample surfaces. Tack free times were measured after irradiation. The results are shown in Table 5:

TABLE 5

| IRRADIATION TIME (sec)[1] | 0 | 15 | 30 | 60 | 120 |
|---|---|---|---|---|---|
| Sample 1* TFT (min)[2] | 12–14 | 12–14 | 10–12 | 8–10 | 6–8 |
| Sample 2 TFT (min)[2] | 12–14 | 7–9 | 3–5 | 1–3 | 0–1 |
| Sample Temp (°C.) | 25 | 40 | 48 | 64 | 84 |

* = Control
1 = Irradiation performed 6 inches from a GEH3T7 lamp.
2 = Tack free time after irradiation.

Table 5 demonstrates that, while heat from the irradiation lamp does appear to accelerate the cure of these types of polydiorganosiloxane systems, the overiding factor in cure acceleration is the presence of the photocatalyst.

EXAMPLE 2

Additional experiments were performed with samples which were similar to those used in example 1. The base formulation ("Base III") contained a mixture of silanol-terminated polydimethylsiloxanes which included the same polymers as in Base I, blended together to provide a material having a viscosity of 15,000 cstk (+ or −2000). The other components used were similar or identical to those used for Base I. Minor amounts of aluminum stearate were added, as shown in Table 6, which sets forth the compositions. Sample 5 is a control, since it does not contain any photocatalyst.

TABLE 6

| | Sample Number And Amount [PBW (weight %)] | | | |
|---|---|---|---|---|
| Component | 5* | 6 | 7 | 8 |
| Base III | 100 (97.1) | 100 (96.8) | 100 (96.5) | 100 (96.2) |
| Crosslinker (EtSi(OAc)$_3$) | 3.0 (2.9) | 3.0 (2.9) | 3.0 (2.9) | 3.0 (2.9) |
| Photocatalyst** | — | 0.3 (0.3) | 0.6 (0.6) | 0.9 (0.9) |
| Components in Expanded Form | | | | |
| Diol polymer | 30.1 (20.8) | 30.1 (20.7) | 30.1 (20.7) | 30.1 (20.6) |
| Diol polymer | 69.9 (48.3) | 69.9 (48.1) | 69.9 (48.0) | 69.9 (47.8) |
| Plasticizing Fluid | 15.0 (10.4) | 15.0 (10.3) | 15.0 (10.3) | 15.0 (10.3) |
| Silica Filler | 20.0 (13.8) | 20.0 (13.8) | 20.0 (13.7) | 20.0 (13.7) |
| Crosslinker (MeSi(OAc)$_3$) | 4.0 (2.8) | 4.0 (2.8) | 4.0 (2.7) | 4.0 (2.7) |
| Adhesion Promoter ((t-BuO)$_2$Si(OAc)$_2$) | 1.5 (1.0) | 1.5 (1.0) | 1.5 (1.0) | 1.5 (1.0) |
| Cure catalyst | 0.03 (0.02) | 0.03 (0.02) | 0.03 (0.02) | 0.03 (0.02) |

TABLE 6-continued

| Component | Sample Number And Amount [PBW (weight %)] | | | |
|---|---|---|---|---|
| | 5* | 6 | 7 | 8 |
| (Bu₂Sn(laurate)) | | | | |
| Aluminum stearate | 0.12 (0.08) | 0.12 (0.08) | 0.12 (0.08) | 0.12 (0.08) |
| EtSi(OAc)₃ | 4.2 (2.9) | 4.2 (2.9) | 4.2 (2.9) | 4.2 (2.9) |
| Photocatalyst** | — | 0.4 (0.28) | 0.8 (.055) | 1.2 (0.82) |

\* = Control
\*\* = (4-octyloxyphenyl)phenyliodonium hexafluoroantimonate)

The formulations set forth in Table 6 were mixed by conventional techniques, and then put into Semco tubes. In samples 6-8, the appropriate amount of photocatalyst was introduced, in the form of a solution with ethyltriacetoxysilane, using dasher rods and Semkit mixers (mixing time was at least 10 minutes). Each sample was then prepared for testing in a manner similar to that of example 1.

Irradiation for this example was carried out by the use of a medium pressure mercury vapor discharge lamp (Porta-Cure 1000, available from American Ultraviolet Co.). The distance from the sample was 6 inches. The irradiating energy schedule was as follows:

| IRRADIATION TIME (Seconds) | UV ENERGY (mJ/cm²) |
|---|---|
| 15 | 182 |
| 30 | 396 |
| 60 | 810 |

(Note that other tests verified that UV output for example 1 was essentially identical to that of example 2, even though different UV lamps were used).

Table 7 sets forth cure properties in terms of tack free times:

TABLE 7

| Irradiation Time (seconds) | Sample Tack Free Times (TFT) (minutes) | | | |
|---|---|---|---|---|
| | 5* | 6 | 7 | 8 |
| 0 | 28 | 30 | 30 | 27 |
| 15 | 27 | 11 | 19 | 13 |
| 30 | 27 | 8 | 11 | 7 |
| 60 | 27 | 7 | 7 | 3 |

\* = Control

The data of Table 7 again demonstrate that the compositions of the present invention exhibit tack free properties which are superior to those of the control. Furthermore, the level of onium salt catalyst within the ranges described in the examples was not found to be especially critical in terms of the degree of cure.

The physical properties for the samples were also measured, both before and after heat-aging. The results are shown in Table 8:

TABLE 8

| PROPERTIES | SAMPLE NUMBER | | | |
|---|---|---|---|---|
| | 5* | 6 | 7 | 8 |
| 7 Days at 25° C., 50% relative humidity: | | | | |
| Shore A Hardness | 30 | 37 | 30 | 35 |
| Tensile Strength (psi) | 473 | 418 | 484 | 434 |
| Elongation (%) | 499 | 405 | 499 | 412 |
| Modulus (psi) | | | | |
| at 50% elong. | 75 | 83 | 75 | 79 |
| 100% | 107 | 119 | 110 | 113 |
| 200% | 138 | 155 | 143 | 150 |
| 7 Days at 70° C. and 7 days at 25° C., 50% relative humidity: | | | | |
| Shore A Hardness | 31 | 37 | 36 | 30 |
| Tensile Strength (psi) | 422 | 520 | 505 | 449 |
| Elongation (%) | 449 | 449 | 432 | 424 |
| Modulus (psi) | | | | |
| at 50% elong. | 80 | 89 | 88 | 83 |
| 100% | 113 | 130 | 128 | 120 |
| 200% | 146 | 169 | 168 | 159 |
| Irradiated followed by 7 days at 25° C., 50% relative humidity**: | | | | |
| Shore A Hardness | 32 | 33 | 33 | 33 |
| Tensile Strength (psi) | 533 | 404 | 472 | 529 |
| Elongation (%) | 481 | 318 | 366 | 397 |
| Modulus | | | | |
| at 50% elong. | 85 | 100 | 95 | 93 |
| 100% | 120 | 147 | 141 | 140 |
| 200% | 156 | 194 | 189 | 189 |

\* = Control
\*\* = Irradiation performed in a PPG UV Procesor housing two Hanovia medium pressure mercury lamps; 850 mJ/cm² of UV energy delivered to samples.

Table 8 demonstrates that the physical properties of irradiated and non-irradiated samples were comparable, even after heat-aging. Although elongation and tensile strength values were decreased in some instances for samples corresponding to this invention, the values are still very acceptable for the contemplated end uses of these compositions.

Although the above examples have shown various embodiments of the present invention, other variations are possible in light of the above teachings. It is therefore to be understood that changes may be made in the particular embodiments, which are within the full intended scope of the invention as defined by the appended claims.

Furthermore, all of the above-mentioned patents, patent applications, and literature references are incorporated herein by reference.

We claim:

1. An improved, curable silicone composition, comprising:
   a) at least one silanol chain-stopped polydiorganosiloxane polymer free of epoxy functional groups having a viscosity in the range of from about 10 to about 1,000,000 centipoise at 25° C.;
   b) a crosslinking agent of the formula

$R_mSi(OR^1)_{4-m}$ wherein R is a monovalent hydrocarbon group containing 1 to about 8 carbon atoms; $R^1$ is an organic radical containing from 2 to about 30 carbon atoms, and m is 0 or 1; and
   c) a catalytic amount of an onium salt photocatalyst.

2. The composition of claim 1, wherein the polydiorganosiloxane polymer of component (a) has the formula

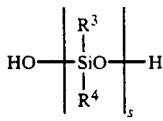

wherein R³ and R⁴ are independently selected monovalent organic groups; and the value of s is such that the viscosity of the polymer is in the indicated range.

3. The composition of claim 2, wherein, in component (a), substantially all of the total number of R³ and R⁴ groups are alkyl, and any remaining groups are aryl.

4. The composition of claim 3, wherein the alkyl groups are methyl or fluoroalkyl, and any remaining aryl groups are phenyl.

5. The composition of claim 1, wherein the viscosity of component (a) is in the range of about 2,000 cps to about 200,000 cps at 25° C.

6. The composition of claim 1, wherein the (OR¹) group of component (b) is either an alkoxy group, an aryloxy group, or an acyloxy group.

7. The composition of claim 6, wherein the crosslinking agent of component (b) is selected from the group consisting of methyl triacetoxysilane; ethyl triacetoxysilane; methyl trisbenzoxysilane; methyl tris 2-ethylhexanoxy silane; and mixtures of any of the foregoing.

8. The composition of claim 1, wherein the photocatalyst of component (c) is selected from the group consisting of halonium salts, Group VA salts, and Group VIA salts.

9. The composition of claim 8, wherein the photocatalyst is present in an amount of from about 0.01% by weight to about 5.0% by weight, based on the weight of the entire composition.

10. The composition of claim 9, wherein the photocatalyst is present in an amount of from about 0.1% by weight to about 1.5% by weight, based on the weight of the entire composition.

11. The composition of claim 8, wherein the halonium salt is an iodonium salt.

12. The composition of claim 11, wherein the iodonium salt is selected from the group consisting of 3-methoxyphenyl-phenyl-phenyl-I⁺ BF₄⁻; 2-nitrophenyl-phenyl-I⁺ BF₄⁻; (C12H25-phenyl)₂I⁺SbF₆⁻; and ((4-octyloxyphenyl)phenyliodonium hexafluoroantimonate).

13. The composition of claim 11, wherein the halonium salt is added to the other components in the form of a solution which comprises an agent selected from the group consisting of triacetoxyethyl silane and methyltrimethoxy silane.

14. The composition of claim 1, further comprising at least one plasticizer.

15. The composition of claim 14, wherein the plasticizer is a diorganopolysiloxane polymer.

16. The composition of claim 15, wherein the plasticizer is a trialkylsilyl-terminated polysiloxane fluid.

17. The composition of claim 15, wherein the plasticizer is present at a level of about 1% by weight to about 30% by weight, based on the weight of the entire composition.

18. The composition of claim 1, further comprising at least one filler.

19. The composition of claim 18, wherein the filler is selected from the group consisting of fumed silica, precipitated silica, crystalline silica, titanium dioxide, zinc oxide, zirconium silicate, silica aerogel, iron oxide, diatomaceous earth, calcium carbonate, chromic oxide, zirconium oxide, alpha quartz, calcined clay, carbon black, graphite, cotton, and synthetic fibers.

20. The composition of claim 18, wherein the filler is present at a level in the range of about 1% by weight to about 70% by weight, based on the weight of the entire composition.

21. The composition of claim 20, wherein the filler is present at a level in the range of about 2% by weight to about 30% by weight, based on the weight of the entire composition.

22. The composition of claim 1, further comprising an adhesion promoter.

23. The composition of claim 22, wherein the promoter is present at a level of about 0.2% by weight to about 3% by weight, based on the weight of the entire composition.

24. The composition of claim 23, wherein the adhesion promoter is selected from the group consisting of silanes containing hydrolyzable groups; cyanate-based materials; and cyanurate-based materials.

25. The composition of claim 24, wherein the adhesion promoter is selected from the group consisting of glycidoxypropyltrimethoxysilane; gamma-aminopropyltrimethoxysilane; gamma-aminopropyltriethoxysilane; methyldimethoxyaminosilane; 2-aminoethylaminopropyltrimethoxysilane; di-tert-butoxydiacetoxysilane; vinyltriacetoxysilane; dibutoxydiacetoxysilane; 1,3,5-tris-trimethoxysilylpropyisocyanate; and bis-1,3-trimethoxysilylpropylisocyanurate.

26. The composition of claim 1, further comprising a catalytic amount of a condensation cure catalyst.

27. The composition of claim 26, wherein the cure catalyst is either a metal complex or a Bronsted acid of a non-metal compound.

28. The composition of claim 26, wherein the cure catalyst is selected from the group consisting of dibutyltindiacetate; dibutyltindilaurate; dibutyltindimethoxide; carbomethoxyphenyl tin trisuberate; tin octoate; isobutyl tin triceroate; dimethyl tin dibutyrate; dimethyl tin di-neodecanoate; triethyl tin tartrate; dibutyl tin dibenzoate; tin oleate; tin naphthenate; butyltin tri-2-ethylhexoate; dibutyltinphthalate; and tinbutyrate.

29. The composition of claim 26, wherein the cure catalyst is present at a level in the range of about 10 ppm to about 2% by weight, based on the weight of the entire composition.

30. The composition of claim 1, further comprising effective amounts of at least one additive selected from the group consisting of dyes, pigments, additional crosslinking agents, thixotropic agents, methanol scavengers, UV stabilizers, and dye sensitizers.

31. A curable silicone composition, consisting essentially of:
a) at least one silanol chain-stopped polydiorganosiloxane polymer free of epoxy functional groups having a viscosity in the range of from about 10 to about 1,000,000 centipoise at 25° C.;
b) a crosslinking agent of the formula

wherein R is a monovalent hydrocarbon group containing 1 to about 8 carbon atoms; R¹ is an organic radical containing from 2 to about 30 carbon atoms, and m is 0 or 1;
c) a catalytic amount of an onium salt photocatalyst.

d) from 0 to about 30% by weight based on the weight of the entire composition of at least one plasticizer;
e) from 0 to about 30% by weight based on the weight of the entire composition of at least one filler;
f) from 0 to about 3% by weight based on the weight of the total composition of at least one adhesion promoter; and
g) from 0 to about 20% by weight based on the weight of the total composition of at least one condensation cure catalyst.

32. A method for preparing improved silicone compositions and articles, comprising the steps of:
a) blending (i) at least one silanol chain-stopped polydiorganosiloxane polymer free of epoxy functional groups having a viscosity in the range of from about 10 to about 1,000,000 centipoise at 25° C., with (ii) a crosslinking agent of the formula $$R_m Si(OR^1)_{4-m}$$

wherein R is a monovalent hydrocarbon group containing 1 to about 8 carbon atoms; $R^1$ is an organic radical containing from 2 to about 30 carbons atoms, and m is 0 or 1;
b) adding a catalytic amount of an onium salt photocatalyst to the blend product of step (a); and then
c) exposing the resulting silicone composition to moisture, and irradiating it according to a time and UV energy schedule effective to condensation cure the composition to a desired degree.

* * * * *